United States Patent
Tsao et al.

(10) Patent No.: US 6,749,305 B1
(45) Date of Patent: Jun. 15, 2004

(54) OPTICAL MODULE AND METHOD FOR ASSEMBLING THE OPTICAL MODULE

(75) Inventors: Chung-Feng Tsao, Taipei (TW); Bun-Liou Liau, Taipei (TW); Kao-Chun Huang, Hsin-Chu Hsien (TW); Yun-Liang Chu, Taipei (TW)

(73) Assignee: Primax Display Corpration, Taipei (TW)

( * ) Notice: Subject to any disclaimer, the term of this patent is extended or adjusted under 35 U.S.C. 154(b) by 0 days.

(21) Appl. No.: 10/604,976

(22) Filed: Aug. 29, 2003

(30) Foreign Application Priority Data

Jun. 18, 2003 (CN) .......................... 03143061 A

(51) Int. Cl.⁷ .......................... G03B 21/00; G03B 21/28
(52) U.S. Cl. .......................... 353/33; 353/81
(58) Field of Search .......................... 353/20, 24, 31, 353/33, 34, 81, 99; 349/5, 8, 9; 348/337, 338

(56) References Cited

U.S. PATENT DOCUMENTS

| | | | | |
|---|---|---|---|---|
| 4,623,916 A | * | 11/1986 | Levine | 348/337 |
| 5,978,054 A | * | 11/1999 | Fujimori | 349/8 |
| 6,089,719 A | * | 7/2000 | Lin | 353/33 |
| 6,247,814 B1 | * | 6/2001 | Lin | 353/33 |
| 6,364,488 B1 | * | 4/2002 | Lin | 353/31 |
| 6,626,540 B2 | * | 9/2003 | Ouchi et al. | 353/31 |
| RE38,306 E | * | 11/2003 | Fujimori et al. | 353/119 |

* cited by examiner

*Primary Examiner*—Christopher Mahoney
(74) *Attorney, Agent, or Firm*—Winston Hsu

(57) ABSTRACT

An optical module is composed of three light-guide units and a holder for the units. Each of the light-guide units is made of a mirror plane used for reflecting and transmitting light installed between two prisms via the use of circularly applied glue. The holder includes three installation areas one installation area for each light-guide unit. Additionally, the holder has two frames that are arranged perpendicularly to each other and each frame is installed perpendicularly to the joining sides of two installation areas i.e. one frame is installed perpendicular to the side where installation area 1 and installation area 2 meet and the other frame is installed perpendicular to the side where installation area 2 and installation area 3 meet.

12 Claims, 15 Drawing Sheets

OPTICAL MODULE AND METHOD FOR ASSEMBLING THE OPTICAL MODULE

BACKGROUND OF INVENTION

1. Field of the Invention

The present invention relates to an optical module and its assembling method, and more specifically, to an optical module and its assembling method of a projecting apparatus.

2. Description of the Prior Art

A projecting apparatus for generating an image is disclosed in U.S. Pat. No. 6,089,719 "Projecting Apparatus For Displaying Electrical Images". Please refer to FIG. 1 showing the projecting apparatus 10 according to U.S. Pat. No. 6,089,719. To display an image on a screen 34, a projecting apparatus 10 comprised of a light source device 22, three modulating units 24, 26, 28, a dichroic-polarization beam splitter prism 30 composed of four triangular prisms 36 of equal proportion, and a projecting lens 32 is used. The light source device 22 is used to generate three different-colored rays red, green, and blue with uniform illumination but different polarities. Each of the modulating units 24, 26, 28 modulates and changes the polarity of one of the single-colored polarized raysby means of reflection. The beam splitter prism 30 is used to first receive the polarized rays of red, green and blue, then guide the rays to their respective modulating units 24, 26, 28 for modulation, and finally converge the three modulated rays into an output beam all of which are accomplished via mirror planes, which transmit or reflect light based its polarity, plated onto the triangular prisms 36 of the beam splitter prism 30. The projecting lens 32 is installed in front of the output face of the beam splitter prism 30 for projecting the output beam to a screen 34.

Other projecting apparatus arealso disclosed in U.S. Pat. No. 6,247,814 "Projecting Apparatus For Displaying Electronic Images" and U.S. Pat. No. 6,364,488 "Projection Display Device For Displaying Electrically Encoded Images" thatincorporate the use of an L-shaped optical module to create an optical path of approximately the same length for the three monochrome rays red, green, and blue in order to reduce the optical design of the projecting apparatus. Please refer to FIG. 2 showing the projecting apparatus 40 according to U.S. Pat. No. 6,247,814. The projecting apparatus 40 includes a light source 42, three modulating units 44, 46, 48, an L-shaped optical module 50, an input lens set 52 and a projecting lens 54.

The light source 42 is for generating monochrome rays in red, green and blue in the same polarity. The three modulating units 44, 46, 48 are for modulating a single-colored polarized ray and changing its polarity by manner of reflection. The L-shaped optical module 50 is for controlling the path of each single-colored polarized ray. The input lens set 52 is installed between the light source 42 and the inner side of the L-shaped optical module 50. The projecting lens 54 is for projecting the beam output from the L-shaped optical module 50 to a screen 56.

To elaborate further upon the L-shaped optical 50, its makeup consists of three rectangular, transparent light-guide units, which are named respectively as a first, second, and third light-guide unit 60, 62, 64. Each light-guide unit is composed of a mirror sandwiched between the diagonals of two triangular prisms 66. The first and third light-guide units 60,64 have a polarization light beam splitter mirror 70,74 respectively while the second light-guide unit has a dichroic mirror 72.

The arrangement of the light-guide units has the second light-guide unit 62 restingat the apexof the first and the third light-guide units 60, 64. This arrangement ideally causes the first and the third polarization beam splitter mirror 70, 74 to be aligned along the same plane, and the second dichroic mirror 72 to be perpendicular to both the first and the third polarization beam splitter mirrors 70, 74. Light is input through the right angle that is located on the inside of the L-shaped optical module 50 and formed by of perpendicular sides 61, 65 of the first and the third light-guide units 60, 64.

Please refer to FIG. 3 now to follow how a projecting apparatus 40 operates. Generally, image signals wish to be displayedare input into the projecting apparatus 40 where images corresponding to the input signals are generated. For instance, the signal from the output port of a computers video card can be connected to the projecting apparatus 40 in order to display the operational mode of the computer. The three modulating units 44, 46, 48 of the projecting apparatus 40 each modulate their respective monochromatic beam according to received image signals. Then an image from each monochromatic beam (a red image 12, a green image 14 and a blue image 16) is outputted and brought together to create one image for users to see.

Continuing with the example of displaying a computer operational mode, the three images (red image 12, the green image 14 and the blue image 16) have equal resolutions (e.g. 800*600 or 1024*768) composed from a plurality of pixels 18. This means that pixels 18 from each of the three images with the same coordinates all correspond to one another. Under ideal conditions, the angles at which the red image 12, the green image 14 and the blue image 16 are projected onto the screen 56 are less than the maximum tolerance level, resulting in the overlap of pixels from the three images with the same coordinates at the same position.

For instance, if the projection angles of the red image 12, the green image 14 and the blue image 16 on the screen 56 are each less than the maximum tolerance level, a pixel 20R on the upper left corner of the red image 12, a pixel 20G on the upper left corner of the green image 14, and a pixel 20B on the upper left corner of the red image 16 will overlap one another and form a single pixel for users to see. However, if any of the projection angles of the red image 12, the green image 14 and the blue image 16 onto the screen 56 is larger than the maximum tolerance level, the pixels of the images with larger than maximum tolerance levels will not be in-line thereby decreasing projection quality. Therefore, it is imperative that the projection angles of the red image 12, the green image 14 and the blue image 16 on the screen 56 each be made less than the maximum tolerance level.

The part that has the biggest effect on whether the projection angles fall within tolerance levels is the L-shaped optical 50 more specifically the three light-guide units 60, 62, 64. Reason being if the three light-guide units 60, 62, 64 are not in proper position with respect to one another, the light-guide units 60, 62, 64 will project their respective single-colored polarized rays at different angles resulting in image quality degradation. Therefore, the design of a conventional L-shaped optical module 50 usually incorporates a holder 80 (FIG. 4) to align and maintain the positions of the three light-guide units 60, 62, 64 so as to guarantee the paths of the single-colored polarized rays.

However, the current-conventional method for assembling the L-shaped optical module 50 is not ideal because it easily leads to misalignment of parts. As can be deduced from the above-given information, any small misalignment can cause any, two, or all of the three beams of red, blue and green to be projected at angles above the maximum tolerance. Pixels therefore do not overlap but lie on different positions on the screen, resultingin lower than expected image quality.

Under conventional methods the manufacturing of light-guide units 60, 62, 64 involves gluing a mirror between two prisms, the mirror of choice either a dichroic mirror 72 or a polarization beam splitter mirror 70,74 depending on the type of light-guide unit is being produced. The assembled light-guide units 60, 62, 64 in FIG. 2 are then attached to the holder 80 as shown in FIG. 4. Each light-guide unit 60, 62, 64 is glued toa different set of four points located on the holder 80. For instance, the second light-guide unit 62 is glued onto the set of points 82, 84, 86, 88 of holder 80, wherein one prism 66 is glued to points 82, 84 and the other prism 66 is glued to points 86, 88.

The problem lies in tolerated errors that occur during the manufacturing process. More specifically, when the two prisms 66 are being glued to one of the two mirrors, the bottoms of the three parts are not always perfectly level when glued together. This means that the assembled light-guide 60, 62, 64 will not lie flush with surface of the holder 80. The effect of such an error is shown in FIG. 5.

FIG. 5 shows a cross-sectional view of the optical module 50 along the line 5—5 in FIG. 4 as viewed from the upper right corner. While FIG. 5 assumes that only one light-guide unit has been assembled with error, one, two, or all three may have the error illustrated by the figure. Because the two prisms 66 of the second light-guide unit 62 were not glued to the dichroic mirror 72 at an even level, the prism 66 glued to points 86, 88 rests higher than the prism 66 glued to points 82, 84. As a result,the dichroic mirror 72 lies at a slant causing the paths of the single-colored polarized rays in the L-shaped optical module 50 to deviate from the intended path. For instance, a green polarized ray G* is reflected by a modulating unit 44 and then passes through the first light-guide unit 60 to the second dichroic mirror 72. Because the dichroic mirror 72 lies at aslant, the polarized ray G* will deviate from the intended path. Therefore, due to the slight error in assembly of the conventional optical module 50, the projection angles of the red image 12, the green image 14 and the blue image 16 may possibly be larger than the maximum tolerance level, which causes low image quality in the optical module 50.

As stated before every manufacturing process has a tolerance level for errors, meaning that every part has slight imperfections. One imperfect part such as the example in FIG. 5 may or may not affect the projection angle enough to cause the angle to be above the maximum tolerance level. However, it is more likely that more than one part is imperfect. The culmination of errors from all parts with imperfections that fall within assembly tolerance increases the likelihood of the projection angles of the monochrome rays to be greater than the maximum tolerance level. In other words, even though the assembly error for every part falls within the manufacturing tolerance for error, there is no guarantee that the angles at which the monochrome rays are projected will fall under the maximum tolerance level.

In addition to the manufacturing problem, there is the problem of the effect of temperature. The temperature difference between the off/onstates of the projecting apparatus 40 can be up to a few tens of degrees (e.g. room temperature is 20° C. while the projecting apparatus 40 is up to 50° C. in operation). However, since the prisms 66 and the holder 80 are made of different materials (in this case glass and metal respectively), the two have different expansion coefficients meaning that the prisms 66 will contract or expand at a rate different from the rate the holder 80 contracts or expands when the projecting apparatus 40 is switched off or on. This effect leads to two things one being the two prisms 66 will push each other away and the other being the holder will push each prism individually up. The ultimate effect is the light-guide unit 60, 62, 64 will become misaligned.

Please refer to FIG. 6 diagramming the forces caused by expansion when temperature rises after the projecting apparatus 40 is switched on. As mentioned above, the prisms 66 are made of glass, and the holder 80 is made of metal. When the temperature rises, the holder 80 will exert forces of F1, F2, F3, F4 on the points 82, 84, 86, 88 to which the prisms 66 are glued because the holders 80 expansion coefficient is larger than that of the prisms 66. In addition, the two prisms 66 will exert forces F5, F6 pushing each other away. With the holder only applying the forces F1, F2, F3, F4 to only the points 82, 84, 86, 88 instead of to the whole surface of the prisms 66 coupled with the prisms 66 pushing each other away, the light-guide unit 62 will rotate because it as a whole experiences an unbalanced moment of force. The rotation of light-guide unit 62 causes the path of the single-colored polarized rays to be changed.

SUMMARY OF INVENTION

It is therefore a primary objective of the present invention to provide an optical module and a method of assembly for a projecting apparatus to solve the problems mentioned above.

Briefly summarized, an optical module includes three light-guide units and a holder. Each of the light-guide units is composed of a mirror plane used to reflect and transmit light sandwiched between two prisms. The holder is composed of three installation areas, one for each light-guide unit, and two frames, each located between two of the installation areas. That is to say, the first frame is located between the first and second installation area while the second frame is located between the second installation area and the third installation area.

One of the features of the present invention is that, a first plane of the first light-guide unit is attached to and glued to a first side of the first frame, a second plane of the second light-guide unit is attached to and glued to a second side of the first frame, and a third plane of the third light-guide unit is attached to and glued to a third side of the second frame.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 6 illustrates the forces exerted on the two prisms after the projecting apparatus is switched on.

FIG. 13 illustrates how the forces are exerted on the two prisms of the first light-guide unit after the projecting apparatus is switched on.

DETAILED DESCRIPTION

Figure 7:
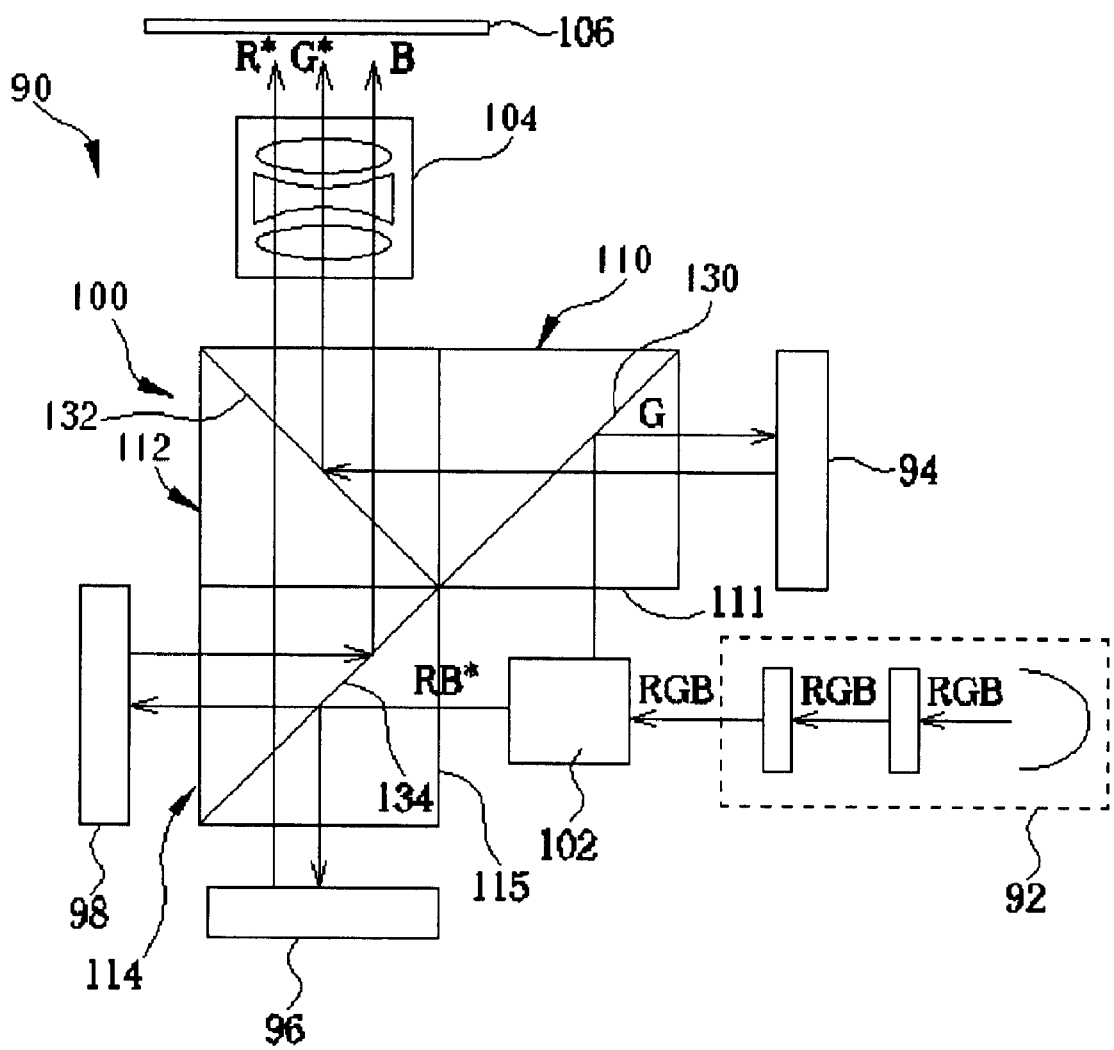
FIG. 7 illustrates an optical module installed on a projecting apparatus according to the present invention.

Please refer to FIG. 7 showing an optical module 100 installed on a projecting apparatus 90 according to the present invention. The projecting apparatus 90 includes a light source 92, three modulating units 94, 96, 98, an optical module 100, an input lens set 102 and a projecting lens 104. The light source 92 is for generating polarized rays in red, green and blue in the same polarity. The three modulating units 94, 96, 98 are for modulating a single-colored polarized ray and changing its polarity by manner of reflection. The optical module 100 is for controlling the path of each single-colored polarized ray, which includes three rectangular transparent light-guide devices referred to as a first light-guide device 110, a secondlight-guide device 112, and a thirdlight-guide device 114, wherein the second light-guide device 112 is positioned at the apex of the first light-guide device 110 and the thirdlight-guide device 114. The input lens set 112 is installed between the light source 92 and the inner side of the optical module 100. The projecting lens 104 is for projecting the beam output from the optical module 100 to a screen 106.

Figure 8:
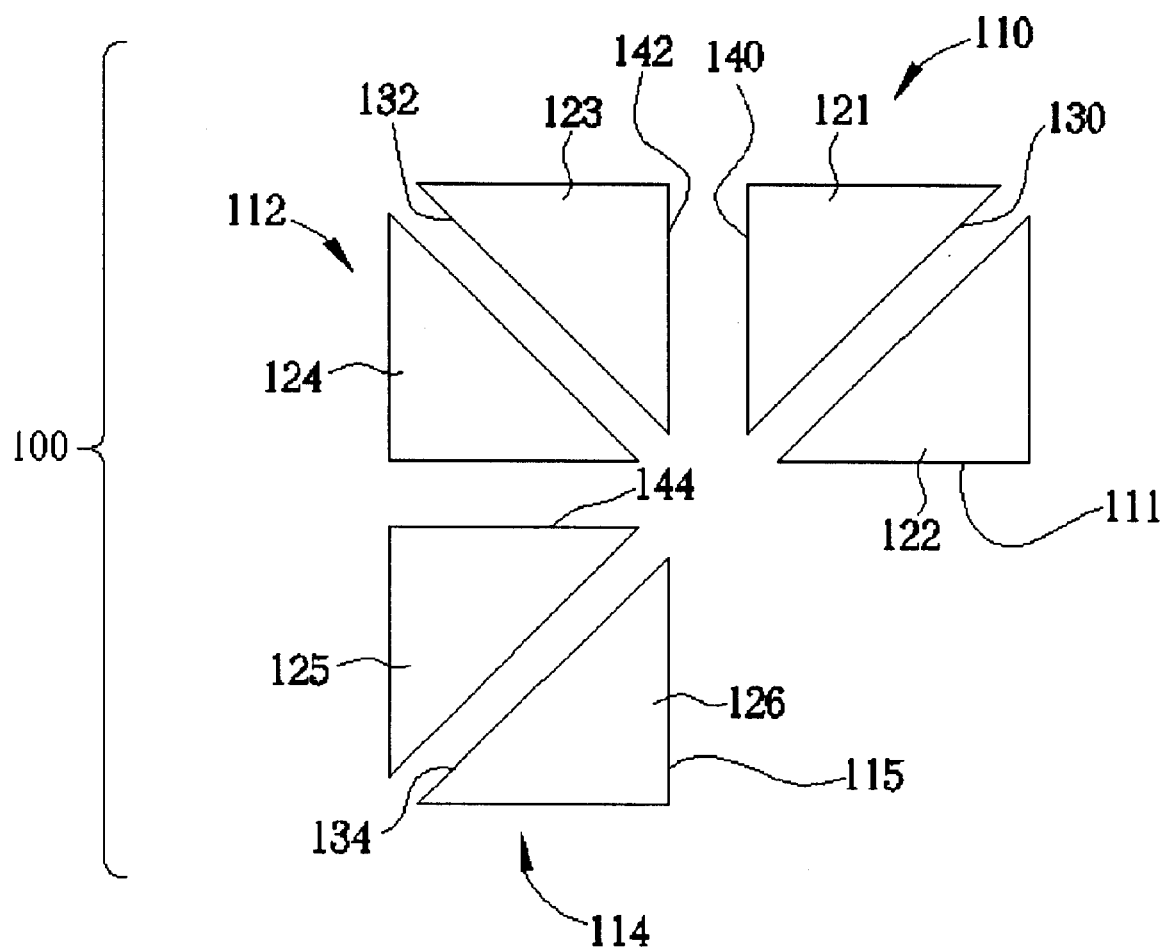
FIG. 8 illustrates adiagram of the first light-guide device, the second light-guide device, and the third light-guide device in FIG. 7 each separated into two prisms.

Please refer to FIG. 8 showing a diagram of the three light-guide devices 110, 112, 114 in FIG. 7 each one separated into two prisms. Each light-guide device is composed of a mirror plane, used to reflect and transmit light, installed between two prisms by gluing the mirror to the prisms. For light-guide device 110, the prisms are prisms 121, 122 and the mirror is mirror plane 130. For light-guide device 112, the prisms are prisms 123, 124 and the mirror is mirror plane 132. For light-guide device 114, the prisms are prisms 121, 122 and the mirror is mirror plane 134.

In this embodiment, mirror planes 130, 134 of the optical module 100 are polarization beam splitter mirrors while mirror plane 132 is a dichroic mirror. The mirrors are arranged in such a manner that the mirror planes 130, 134 lie in the same plane and themirror plane 132 lies perpendicular to both of them. This arrangement provides the optical module 100 with the same optical characteristic as that of the optical module 50 disclosed in U.S. Pat. No. 6,247,814.

Alternatively, one could use polarization beam splitter mirrors for all three mirror planes 130, 132, 134 in the optical module 100. This arrangement provides the optical module 100 with the same optical characteristic as that of the L-shaped optical module 50 disclosed in U.S. Pat. No. 6,364,488. Under this arrangement though, the projecting lens 104 of the projecting apparatus 90 must be moved from the topside of the second light-guide device 112 to the left side of the second light-guide device 112.

Figure 9:
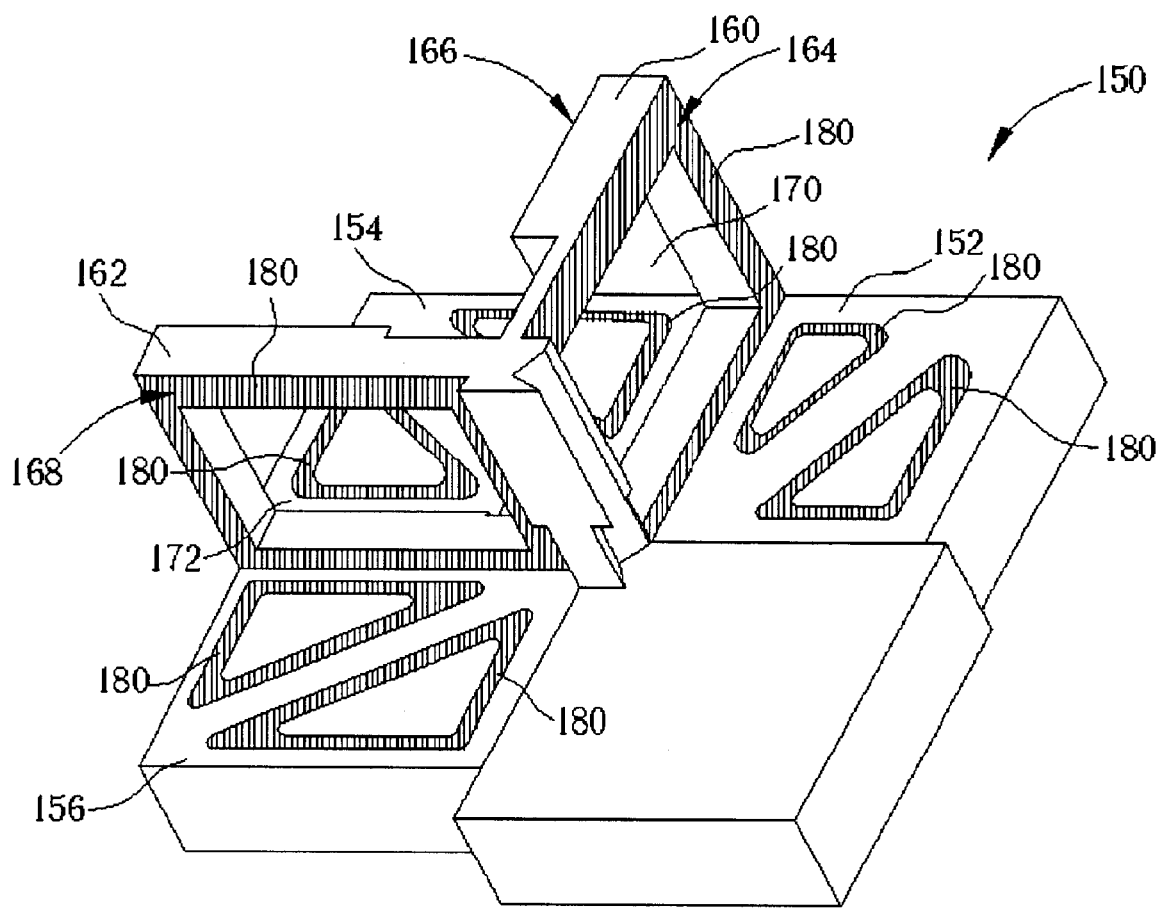
FIG. 9 illustrates a holder of the optical module in FIG. 7.

Please refer to FIG. 9 showing a holder 150 of the optical module 100 in FIG. 7. The holder 150 is made of metal and has three installation areas first installation area 152, second installation area 154, third installation area 156 for installing their respective light-guides first light-guide device 110, second light-guide device 112, third light-guide device 114. The holder 150 also has two frames first frame 160 and a second frame 162. The first frame 160 is installed perpendicularly between the first installation area 152 and the second installation area 154, and the second frame 162 is installed perpendicularly between the second installation area 154 and the third installation area 156 and perpendicular to the first frame 160. Moreover, the first frame 160 and second frame 162 respectively form two light paths 170, 172 for light from the three light-guide devices 110, 112, 114 to travel along.

Figure 10:
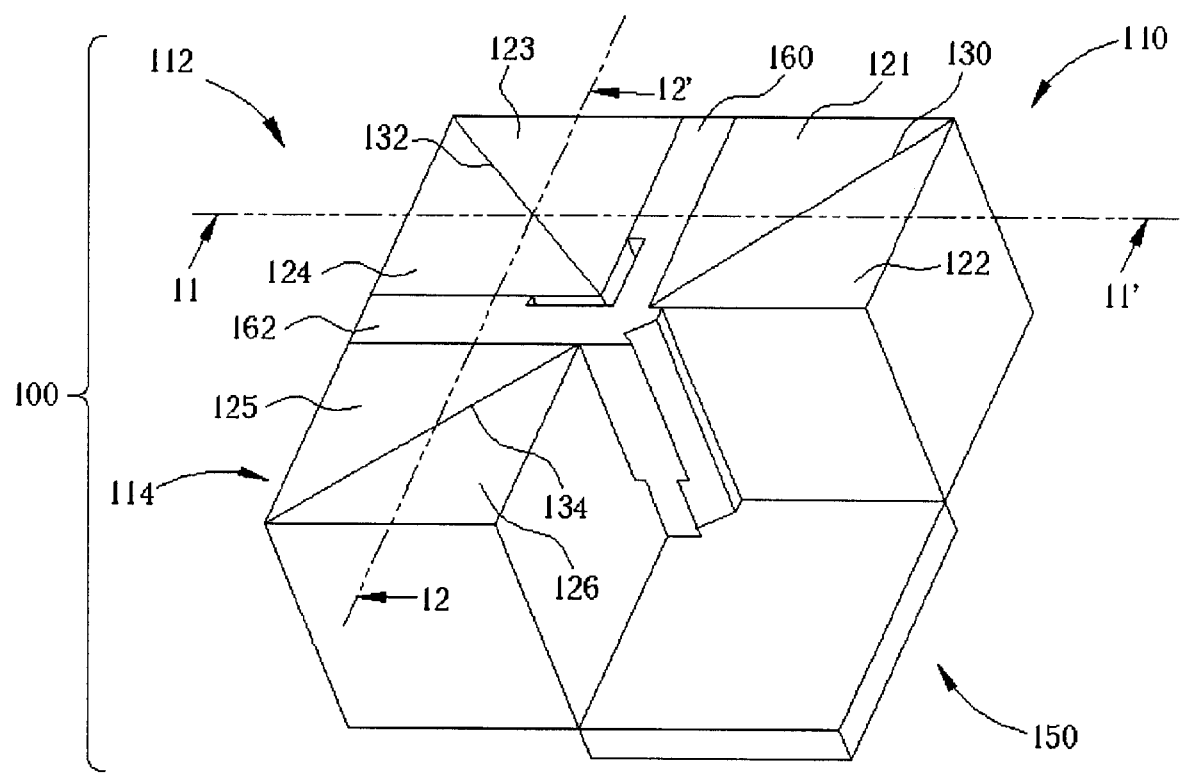
FIG. 10 illustrates an assembled optical module in FIG. 7.

Please refer to FIG. 8–FIG. 10. FIG. 10 shows an assembled optical module 100 in FIG. 7. As shown in FIG. 9 to assemble the optical module 100, first apply some glue 180 on the two sides 164, 166 of the first frame 160 and one side 168 of thesecond frame. Then circularly apply some glue 180 in each of the installation areas 152, 154, 156. Finally attach each of the light-guides first light-guide device 110, second light-guide device 112, third-light-guide device 114 to its respective installation areas first installation area 152, second installation area 154, third installation area 156. The orientation of the light-guide devices 110, 112, 114 should be the same as that shown in FIG. 7 in which the first mirror plane 130 and the third mirror plane 134 lie in the same plane, and the second mirror plane 132 lies perpendicular to them both.

All three light-guide units 110, 112, 114 are all attached to the holder 150 in the same manner. The light-guide unit has only the side of one of its prisms attached to one side of one of the frames and both of its prisms attached to the installation area via the previously applied glue 180. In this embodiment, first light-guide unit 110 has the side 140 of prism 121 attached to side 164 of the first frame 160 and both of its prisms 121, 122 attached to installation area 152. Second light-guide unit 112 has the side 142 of prism 123 attached to side 166 of the first frame 160 and both of its prisms 123, 124 attached to installation area 152. Finally, the third light-guide unit 114 has the side 144 of prism 125 attached to side 168 of the second frame 162 and both of its prisms 125, 126 attached to installation area 152.

Figure 11:
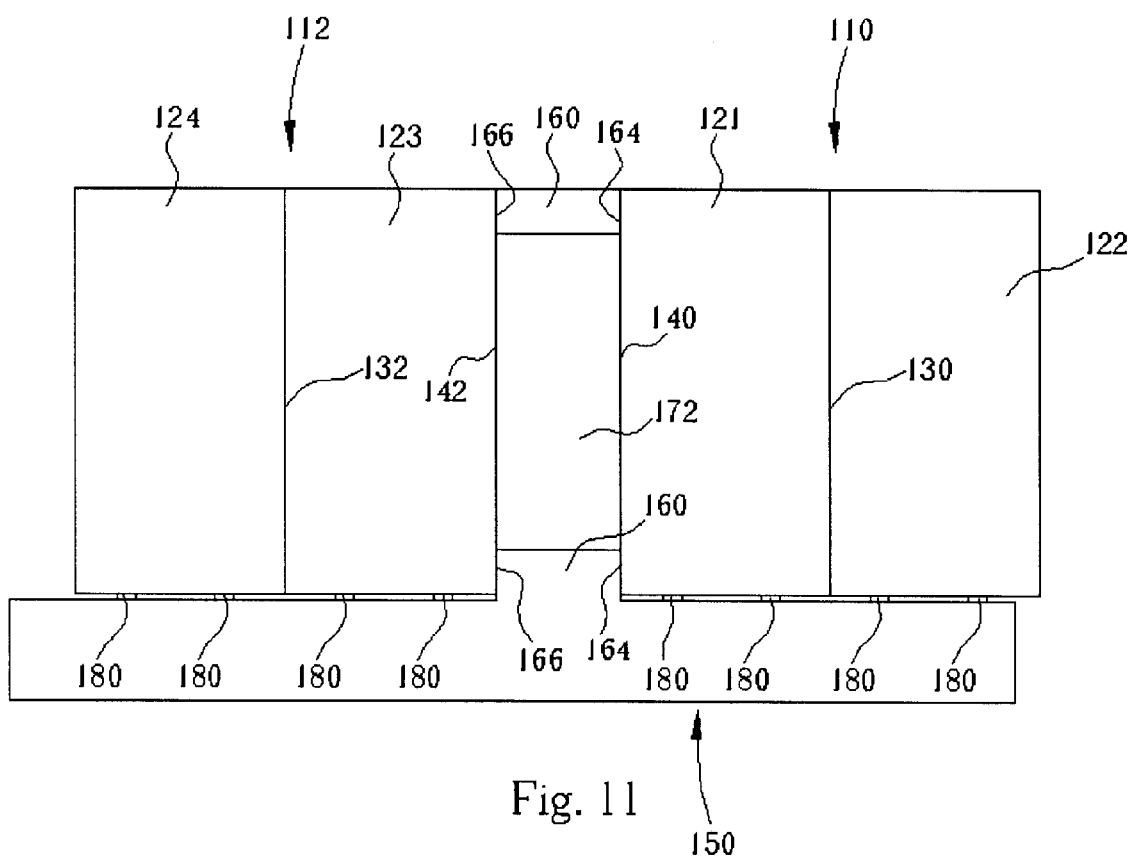
FIG. 11 illustrates a cross section of the optical module along line 11–11" in FIG. 10.
Figure 12:
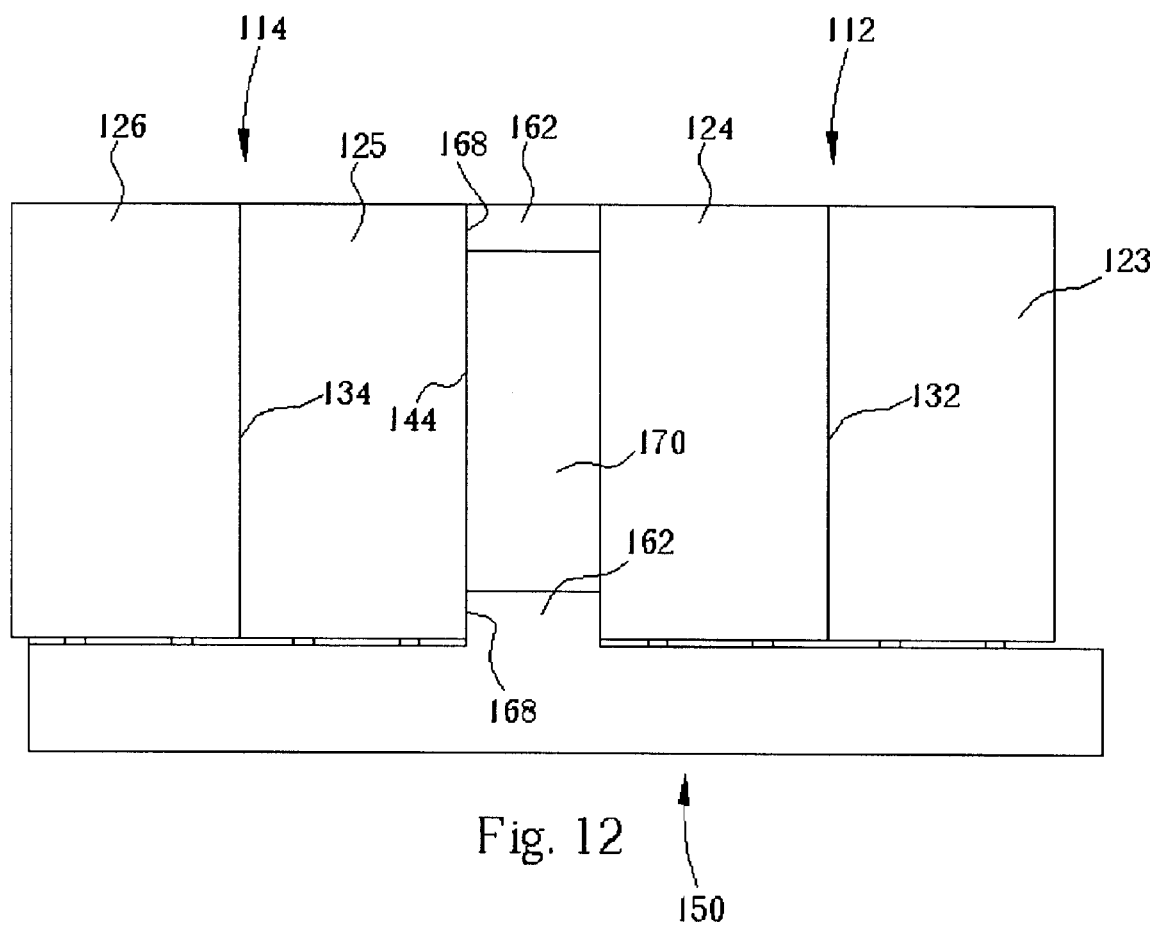
FIG. 12 illustrates a cross section of the optical module along line 12–12" in FIG. 12.

In order to describe the advantages of the present invention, please refer to FIG. 7 and FIG. 10–FIG. 12. FIG. 11 shows a cross section of the optical module 100 along the line 11–11" in FIG. 10 while FIG. 12 shows a cross section of the optical module 100 along the line 12–12" in FIG. 10.

Figure 5:
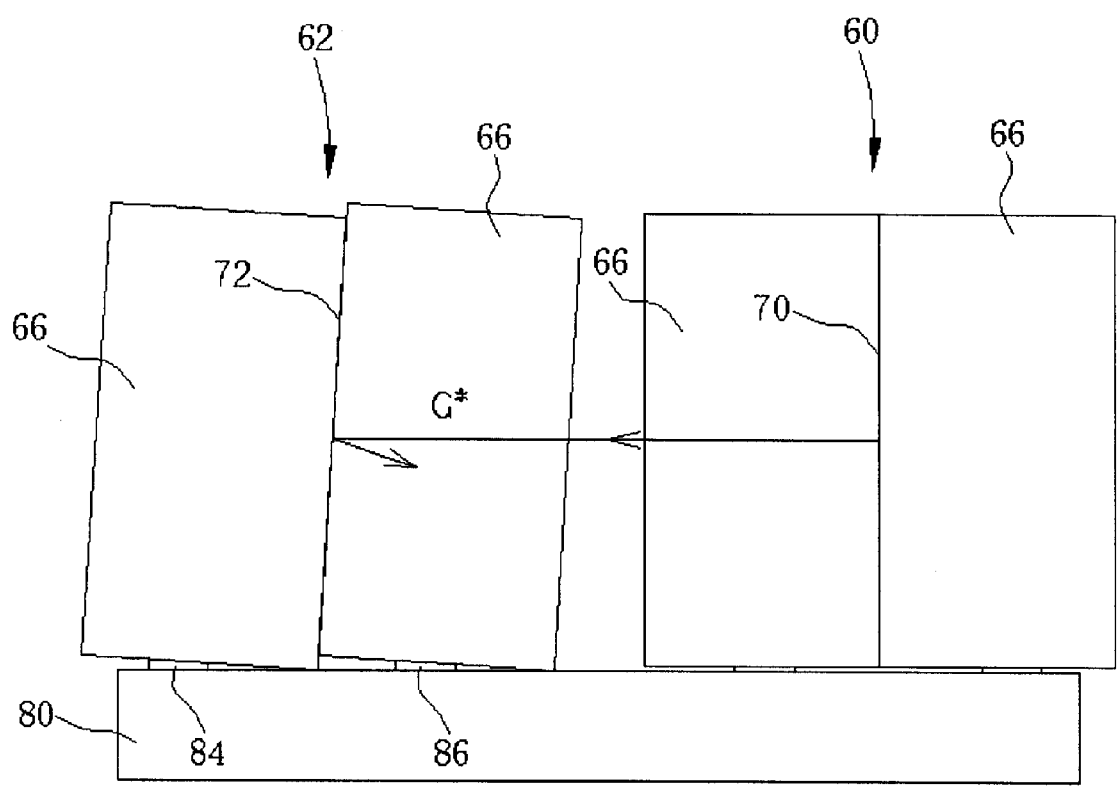
FIG. 5 illustrates a cross section of the optical module along line 5–5" in FIG. 4.

Please refer to FIG. 11 for the first description and FIG. 12 for the second. As described above, there are three light-guide units 110, 112, 114 attached to the holder 150. One case involves light-guide units 110, 112 where the side 140 of prism 121 from light-guide unit 110 is attached to side 164 of the first frame 160 and the side 142 of prism 123 from light-guide unit 112 is attached to side 166 of the first frame 160. Because the two sides of 164, 166 of the first frame 160 are inherently parallel to each other,the first mirror plane 130 is perpendicular to the second mirror plane 132 (as shown in FIG. 7) instead of being oblique as the mirror plane 72 is to mirror plane 70 (as shown in FIG. 5).

The other case involves light-guides 112, 114, where light-guide 112 is attached in the manner described above and the side 144 of prism 125 from light-guide unit 114 is attached to side 168 of the second frame 162. Because the first frame 160 is perpendicular to the second frame 162, the same result is achieved. Namely, the second mirror plane 132 is perpendicular to the third mirror plane 134 (as shown in FIG. 7) instead of being oblique as the mirror plane 72 is to mirror plane 70 (as shown in FIG. 5)

Therefore, when the three light-guide devices 110, 112, 114 are glued onto the holder 150 in the manner described above, the three mirror planes 130, 132, 134 will be held fixed at the correct position to the holder 150. Each single-colored polarized ray can then pass along the intended path without deviation. No deviation means that the quality of projection does not suffer.

Figure 13:
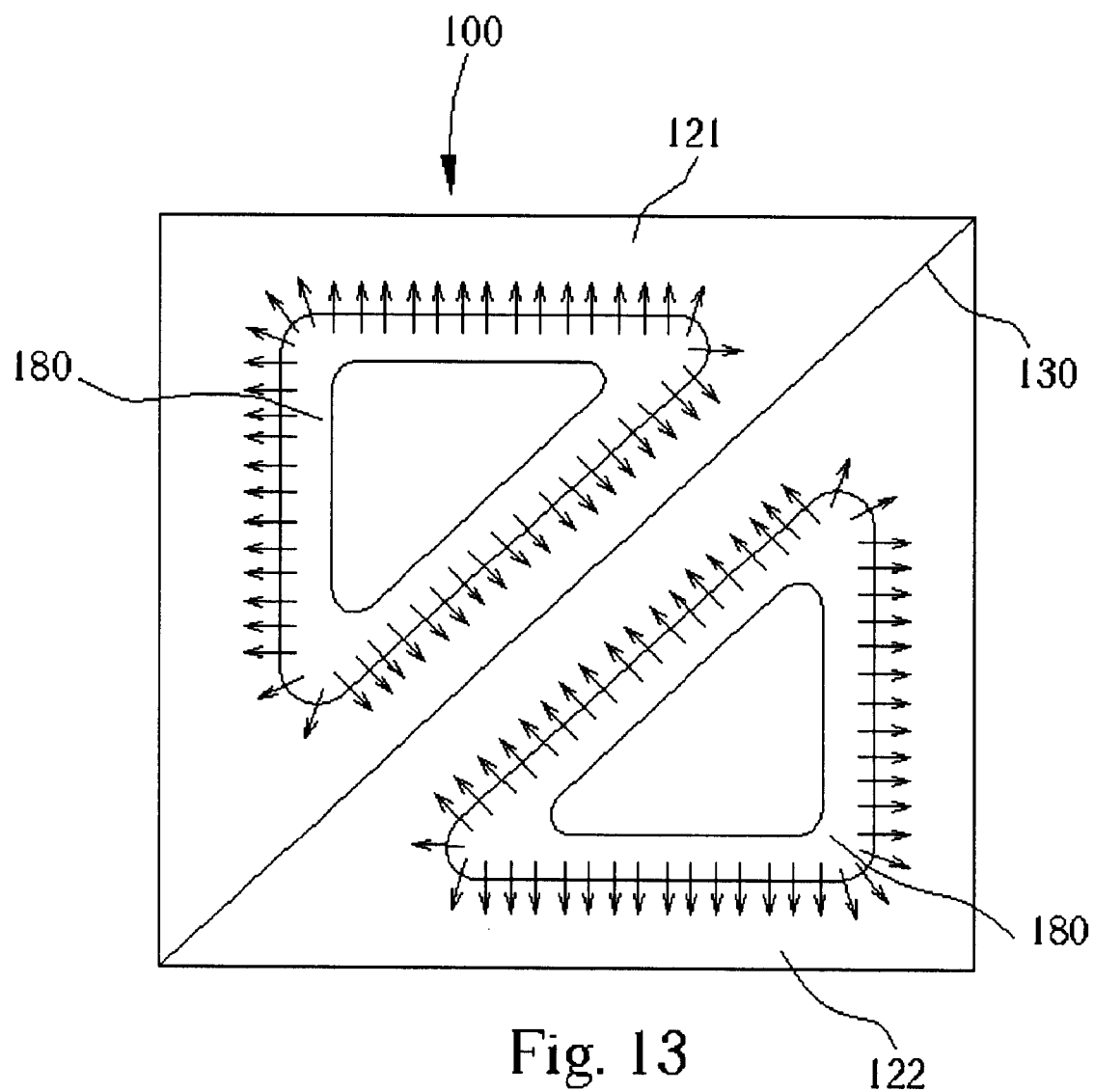

In addition, compared with the optical module 50, the path of single-colored polarized rays in the optical module 100 is less influenced by temperature. Please refer to FIG. 13 showing how forces are exerted on the two prisms 121, 122 of the first light-guide unit 110 after the projecting apparatus 90 is switched on. Since the holder 150 and the prisms 121, 122 are respectively made of metal and glass, the expansion coefficient of the holder 150 is larger than that of the prisms 121, 122. The result is that when the projecting apparatus 100 is switched on and the temperature rises, the expansion per unit of length of the holder is larger than that of either of the prisms 121, 122.

Figure 6:
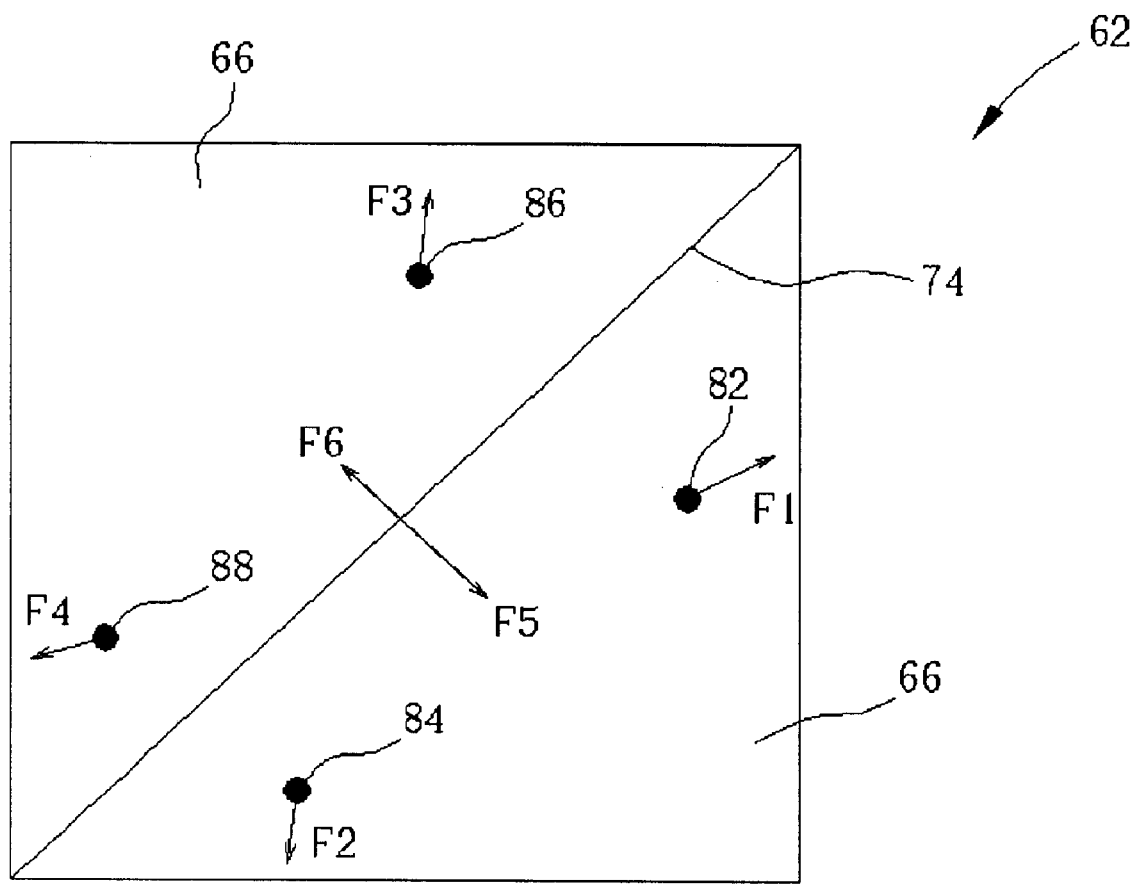

In the design of this invention, the direction of force exerted by the holder 150 via the glue 180 onto the prism121 is from the center of the prism 121 towards the three sides of the prism 121. Because the glue is applied circularly instead of just at four points as shown in FIG. 6 of the Prior Art, the vector sum of the exerted forceson prism 121 is zero. The result is that even though the prism 121 is under condition of force and moment balance, the position of the first mirror plane 130 on the holder 150 will not deviate due to temperature. All the other prisms 122–126 experience the same result as prism 121 meaning that; the position of the second mirror plane 132 and the third mirror plane 134 will not deviate.As a result,the paths of each single-colored polarized ray will not be changed due to temperature. Moreover, the glue 180 for used on the prisms 121–126 is flexible so that even if the holder 150 and the six prisms 121–126 pull or push each other due to the surrounding temperature, the prisms 121–126 will not be damaged.

Figure 1:
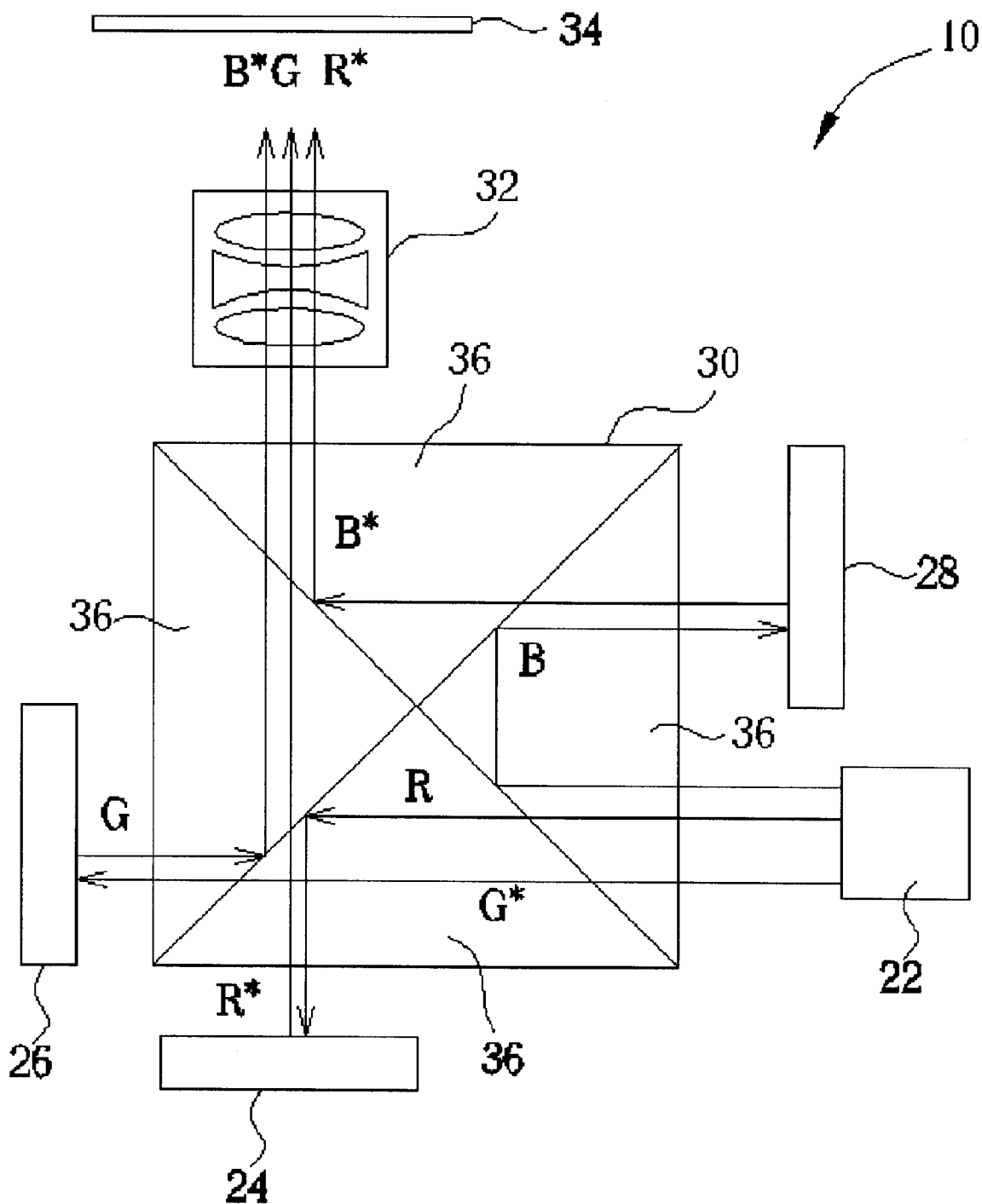
FIG. 1 illustrates a conventional projecting apparatus.
Figure 2:
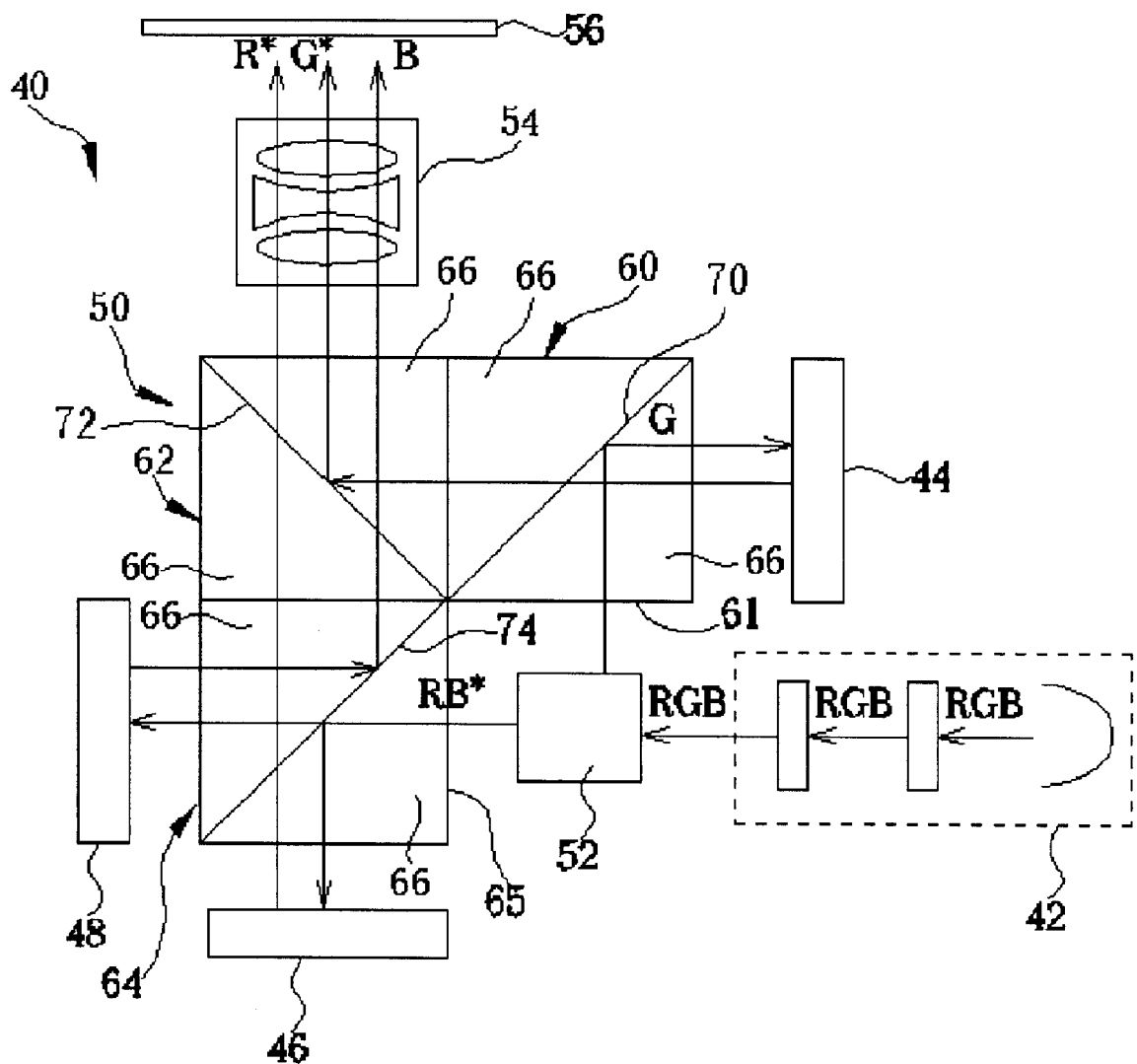
FIG. 2 illustrates another conventional projecting apparatus.
Figure 3:
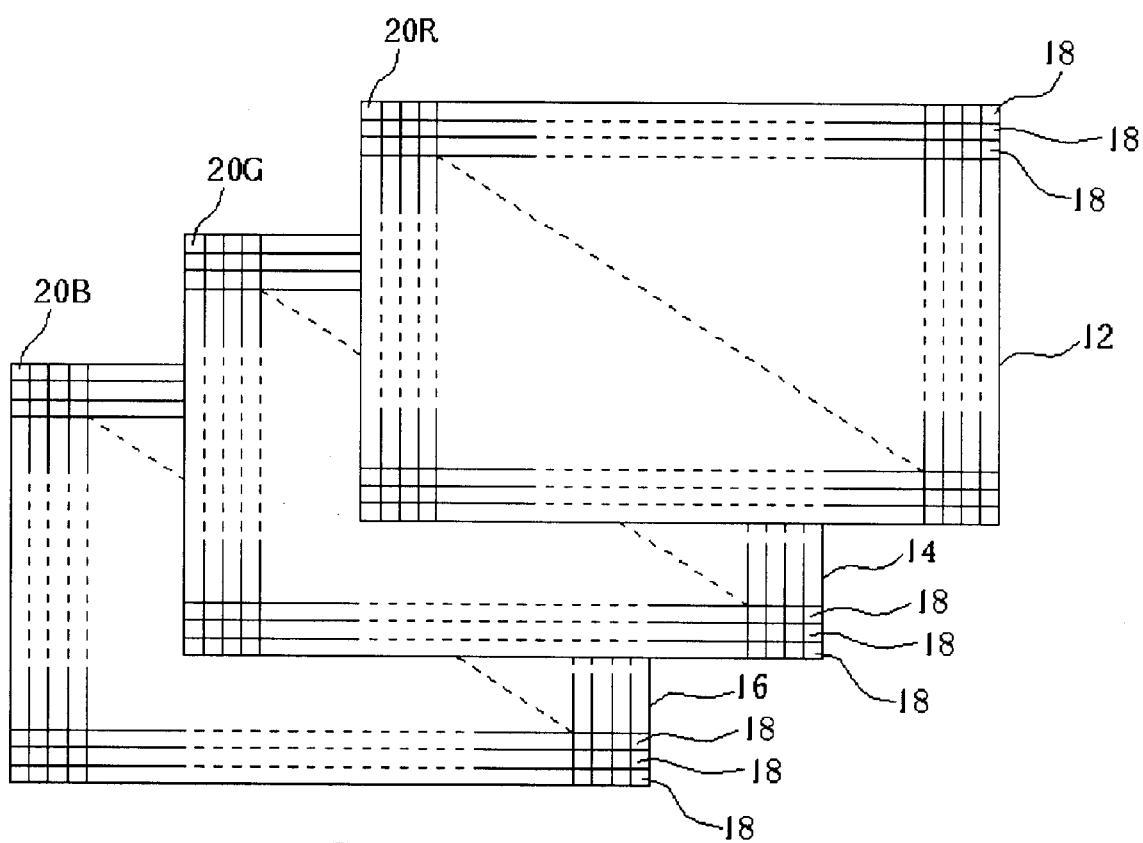
FIG. 3 illustrates how the projecting apparatus in FIG. 1 operates.
Figure 4:
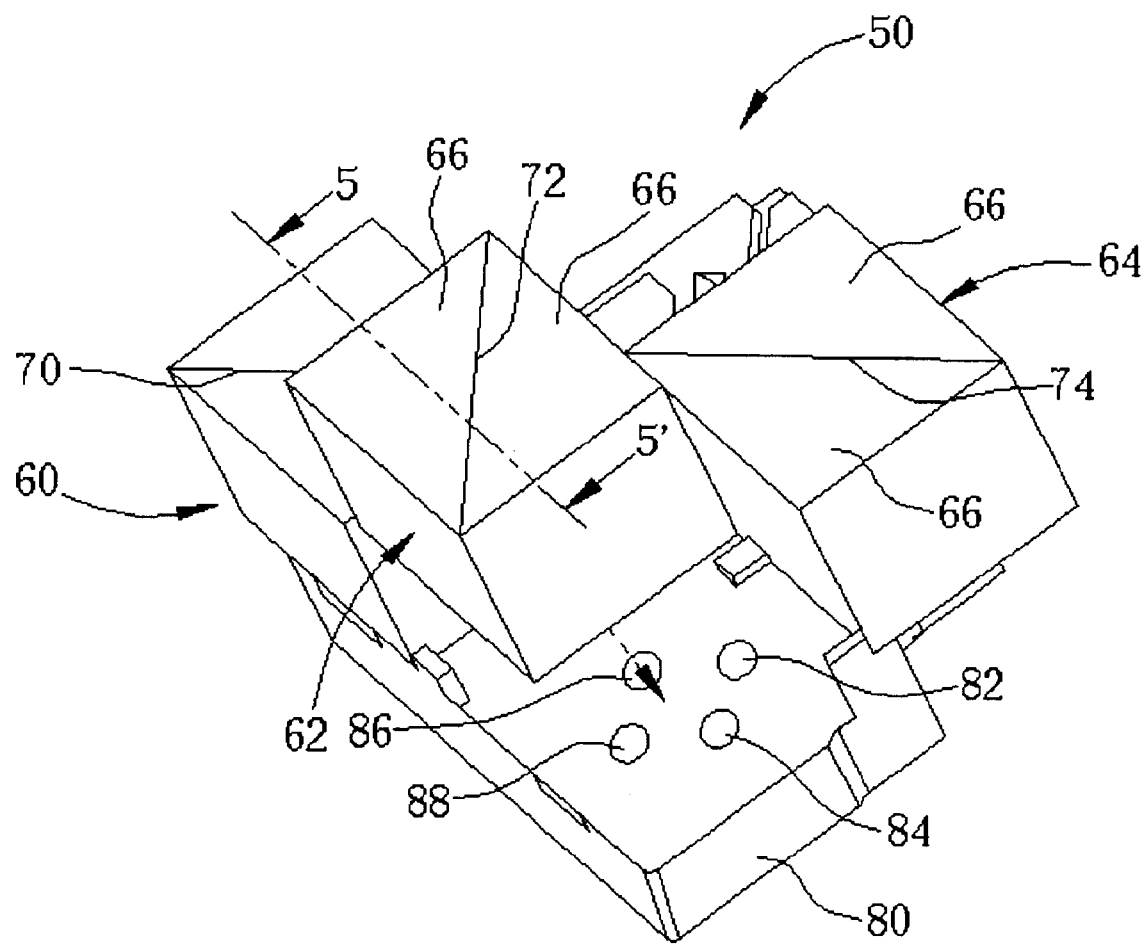
FIG. 4 illustrates how to install the three light-guide units in FIG. 1 onto the holder.
Figure 14:
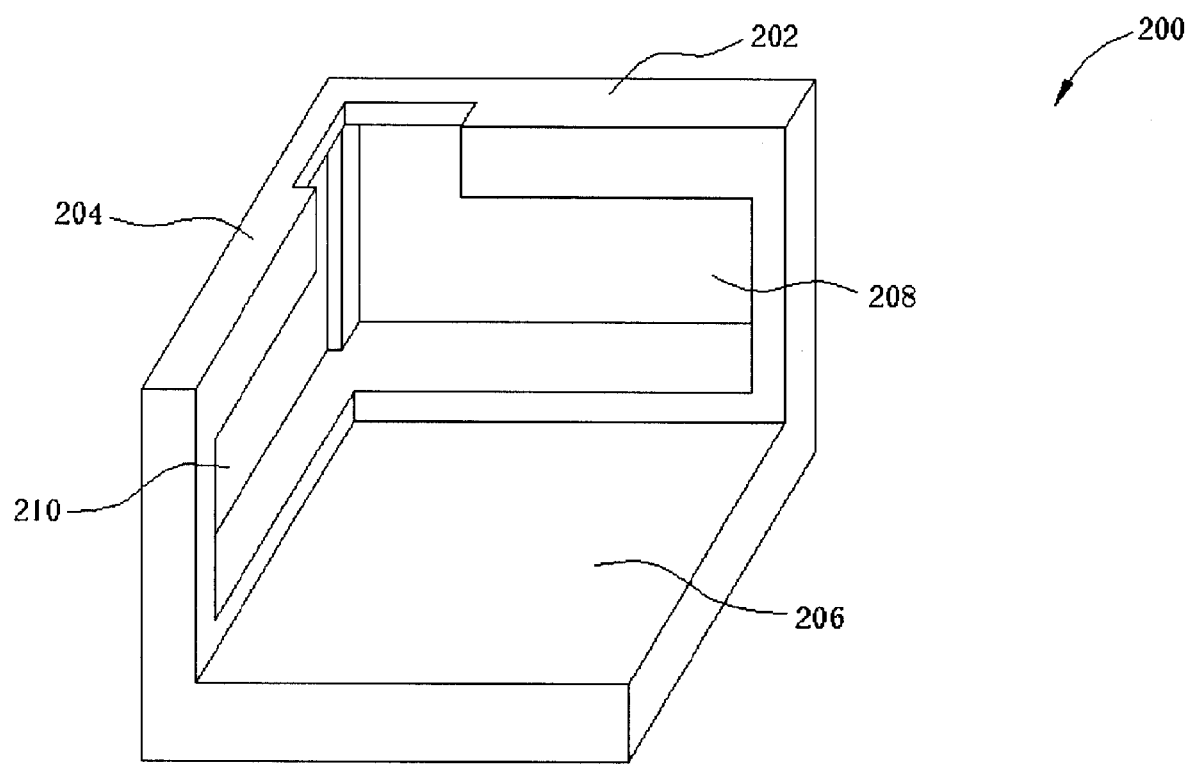
FIG. 14 illustrates another holder according to the present invention.
Figure 15:
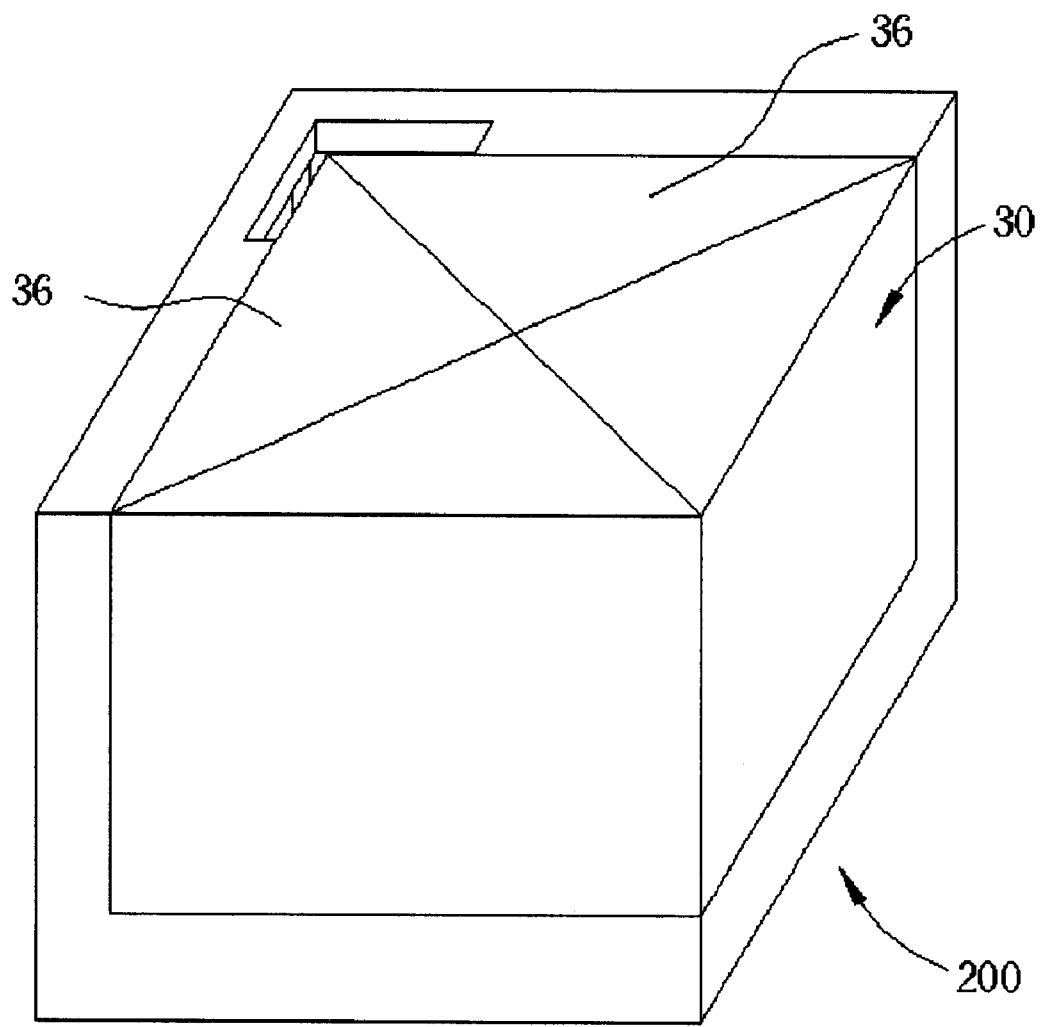
FIG. 15 illustrates the dichroic-polarization beam splitter prism in FIG. 1 installed onto the holder in FIG. 14.

The holder and the assembling method according to the present invention not only can be applied in the L-shaped optical module 50, but also can be used for fixing the conventional dichroic-polarization beam splitter prism 30 in FIG. 1. Please refer to FIG. 14 showing another holder 200 according to the present invention, and FIG. 15 showing the dichroic-polarization beam splitter prism 30 in FIG. 1 installed on the holder 200 in FIG. 14. The holder 200 includes two frames 202, 204 integrated into each other and an installation area 206 wherein the first frame 202 and the second frame 204 respectivelyform a first light path 208 and a second light path 210 for light to pass along.

When installing the dichroic-polarization beam splitter prism 30 on the holder 200, as shown in FIG. 15, apply glue along the inner sides of the first frame 202, second frame 204, and the installation area 206. The attach the dichroic-polarization beam splitter 30 to the two frames 202, 204 and the installation area 206 with the two inners sides of the dichroic-polarization beam splitter 30 facing the two frames 202, 204. In this manner, the dichroic-polarization beam splitter prism 30 can be fixed to the holder 200.

In contrast to the prior art, the present invention calls for the holder of the optical module to have two frames installed perpendicularly on the top. Furthermore, the side of one prism from each of the light-guide units of the optical module is attached to the side of one of the frames. In addition, when the glue used to attach the prisms to the holder is to be applied in a circular fashion so as to reach the condition of force and moment balance without deviation more easily. The sum of these changes result is that when the optical module is assembled, the influence on the paths of single-colored rays due to manufacturing tolerance of the light-guide devices can be reduced to the minimum.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical module comprising:
   a first light-guide unit comprising a first prism, a second prism and a first mirror plane, wherein the first mirror plane is installed between the first prism and the second prism for reflecting and transmitting light;
   a second light-guide unit comprising a third prism, a fourth prism and a second mirror plane, wherein the second mirror plane is installed between the third prism and the fourth prism for reflecting and transmitting light;
   a third light-guide unit comprising a fifth prism, a sixth prism and a third mirror plane, wherein the third mirror plane is installed between the fifth prism and the sixth prism for reflecting and transmitting light; and
   a holder comprising:
      a first installation area for installing the first light-guide unit;
      a second installation area for installing the second light-guide unit;
      a third installation area for installing the third light-guide unit;
      a first frame installed between the first installation area and the second installation area; and
      a second frame perpendicular to the first frame and installed between the second installation area and the third installation area;
      wherein a first plane of the first prism is attached to and glued to a first side of the first frame, a second plane of the third prism is attached to and glued to a second side of the first frame, a third plane of the fifth prism is attached to and glued to a third side of the second frame, and the first light-guide unit, the second light-guide unit, and the third light-guide unit are glued in the first installation area, the second installation area, and the third installation areas respectively.

2. The optical module of claim 1 wherein the first prism, the second prism, the third prism, the fourth prism, the fifth prism, and the sixth prism are glued to the holder.

3. The optical module of claim 2 wherein the first prism, the second prism, the third prism, the fourth prism, the fifth prism, and the sixth prism are glued to the holder by glue being applied circularly on the holder.

4. The optical module of claim 1 wherein the first mirror plane and the second mirror plane are perpendicular to each other, the first mirror plane and the third mirror plane are parallel to each other, and the second mirror plane and the third mirror plane are perpendicular to each other.

5. The optical module of claim 1 wherein the first side of the first frame is parallel to the second side of the first frame.

6. A method for assembling an optical module, the optical module comprising:
   a first light-guide unit comprising a first prism, a second prism, and a first mirror plane, wherein the first mirror plane is installed between the first prism and the second prism for reflecting and transmitting light;

a second light-guide unit comprising a third prism, a fourth prism, and a second mirror plane, wherein the second mirror plane is installed between the third prism and the fourth prism for reflecting and transmitting light;

a third light-guide unit comprising a fifth prism, a sixth prism, and a third mirror plane, wherein the third mirror plane is installed between the fifth prism and the sixth prism for reflecting and transmitting light; and a holder comprising:
- a first installation area for installing the first light-guide unit;
- a second installation area for installing the second light-guide unit;
- a third installation area for installing the third light-guide unit;
- a first frame installed between the first installation area and the second installation area; and
- a second frame perpendicular to the first frame and installed between the second installation area and the third installation area;

the method comprising:
- glueing and attaching a first plane of the first prism to a first side of the first frame and glueing the first light-guide unit to the first installation area;
- glueing and attaching a second plane of the third prism to a second side of the first frame and glueing the second light-guide unit to the second installation area; and
- glueing and attaching a third plane of the fifth prism to a third side of the second frame and glueing the third light-guide unit to the third installation area.

7. The method of claim 6 further comprising:
glueing the first prism onto the holder;
glueing the second prism onto the holder;
glueing the third prism onto the holder;
glueing the fourth prism onto the holder;
glueing the fifth prism onto the holder; and
glueing the sixth prism onto the holder.

8. The method of claim 7 further comprising:
applying glue circularly on the holder when glueing the first prism, the second prism, the third prism, the fourth prism, the fifth prism, and the sixth prism onto the holder.

9. The method of claim 6 further comprising:
glueing the first light-guide unit onto the first installation area while keeping the first mirror plane perpendicular to the second mirror plane and glueing the second light-guide unit onto the second installation area.

10. The method of claim 6 further comprising:
glueing the first light-guide unit onto the first installation area while keeping the first mirror plane parallel to the third mirror plane and glueing the third light-guide unit onto the third installation area.

11. The method of claim 6 further comprising:
glueing the second light-guide unit onto the second installation area while keeping the second mirror plane perpendicular to the third mirror plane and glueing the third light-guide unit onto the third installation area.

12. The method of claim 6 wherein the second side of the first frame is parallel to the first side of the first frame.

* * * * *

UNITED STATES PATENT AND TRADEMARK OFFICE
CERTIFICATE OF CORRECTION

PATENT NO.    : 6,749,305 B1
DATED         : June 15, 2004
INVENTOR(S)   : Tsao et al.

It is certified that error appears in the above-identified patent and that said Letters Patent is hereby corrected as shown below:

Title page,
Item [73], Assignee, delete "Primax Display Corpration" to read -- Primax Display Corporation --

Signed and Sealed this

Twenty-third Day of November, 2004

JON W. DUDAS
*Director of the United States Patent and Trademark Office*